2 Sheets--Sheet 1.
J. GARFIELD.
Mowing-Machine.
No. 161,024.
Patented March 23, 1875.
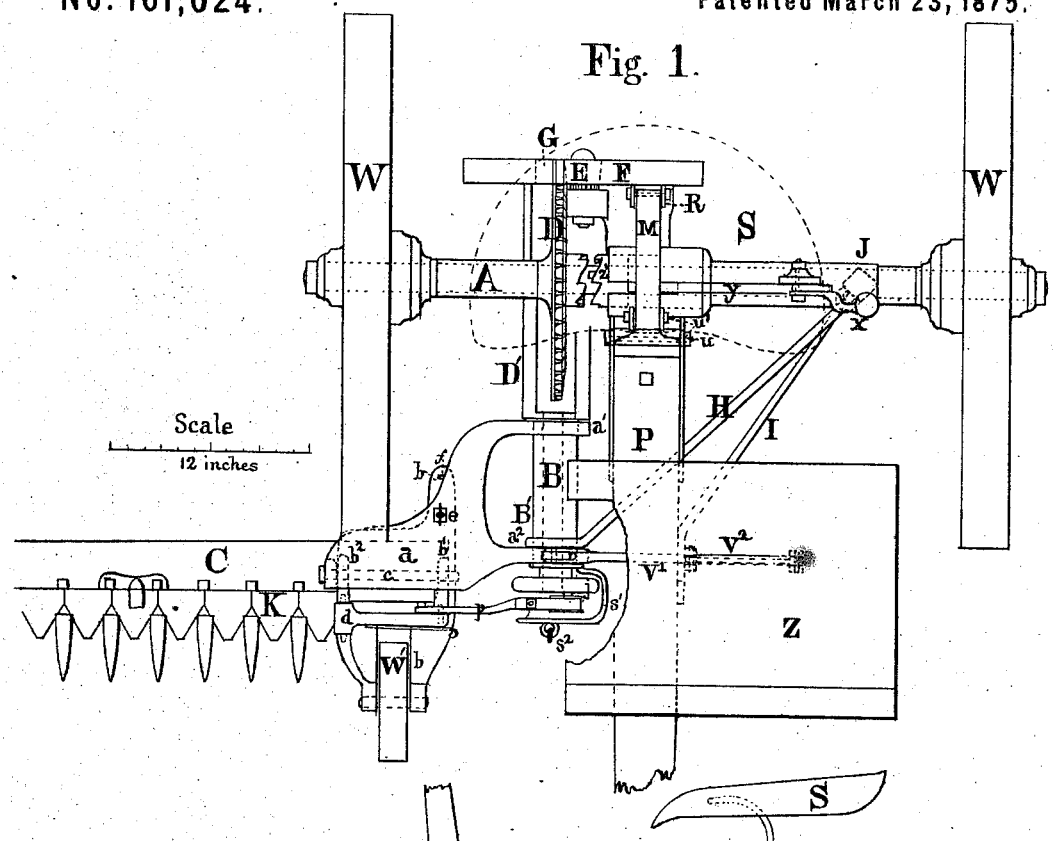
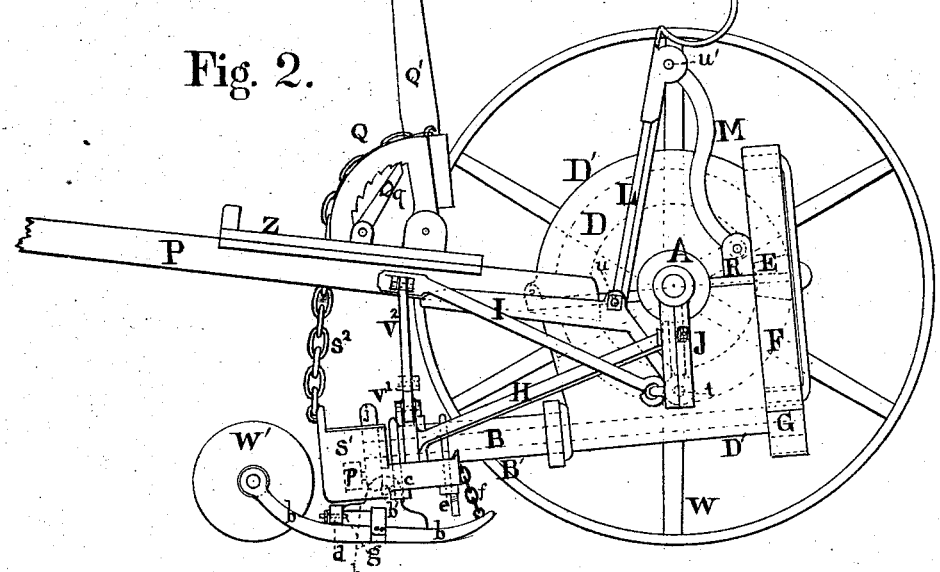
Witnesses
E. A. Hildreth.
S. B. Hildreth.
Inventor
Joel Garfield J. GARFIELD.
Mowing-Machine.
No. 161,024.
2 Sheets--Sheet 2.
Patented March 23, 1875.
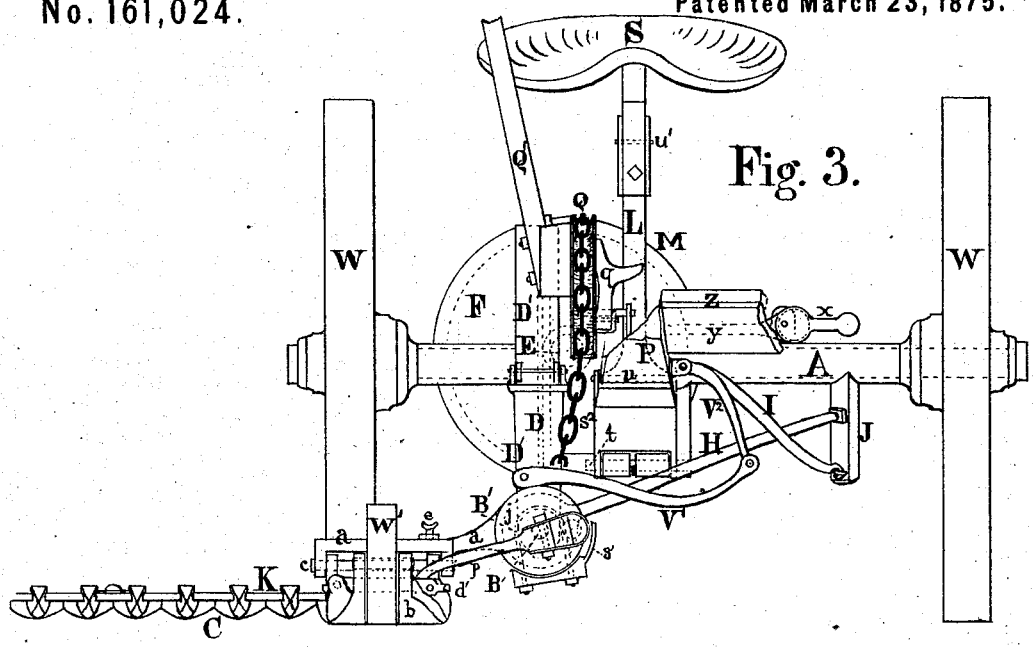
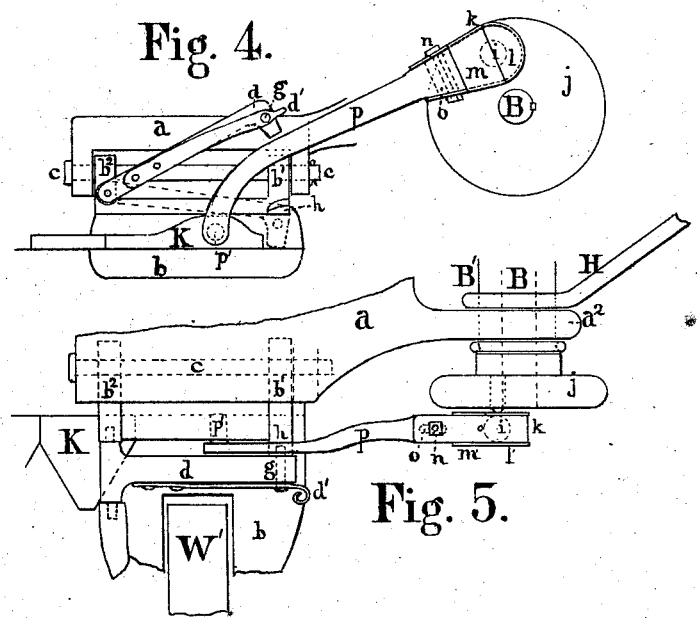
Witnesses
E. A. Hildreth
S. B. Hildreth
Inventor
Joel Garfield

UNITED STATES PATENT OFFICE.

JOEL GARFIELD, OF AYER, MASSACHUSETTS.

IMPROVEMENT IN MOWING-MACHINES.

Specification forming part of Letters Patent No. 161,024, dated March 23, 1875; application filed January 28, 1874.

*To all whom it may concern:*

Be it known that I, JOEL GARFIELD, of Ayer, in the county of Middlesex and State of Massachusetts, have invented certain Improvements in Mowing-Machines, of which the following is a specification:

My invention relates to that class of mowing-machines which are mounted on two wheels, having the finger-bar and vibrating knives on one side of the machine.

The nature of my invention is such that the dead weight of the finger-bar on the ground is lessened, causing the finger-bar more easily to follow the irregularities of the ground, and lessening the draft of the machine; also, in so attaching and connecting the finger-bar to the main frame that the bar can vary its position in relation to the main frame without interfering in the least with the action of the pitman, at the same time giving great strength to the machine; also, in so arranging the pitman-boxes and the crank-pin that the pitman may be held securely in place, while leaving the pitman free to adjust itself to all the different positions of the knife-bar.

In the accompanying drawings, Figure 1 is a top view of a machine embodying my invention, with seat and elevating-arm removed to more clearly show the other parts. Fig. 2 is a side view of the same on the side opposite the cutter-bar, with one wheel removed. Fig. 3 is a front view of the same. Figs. 4 and 5 show the pitman and parts with which it is connected, drawn in detail, and enlarged to more clearly show their construction.

A is the main axle of the mowing-machine, covered by a shield-tube, forming a part of the main frame. W W are the main driving-wheels, provided with ratchets in the hubs. C is the finger-bar, located forward and to the right of the main driving-wheels. K is the knife-bar, operated by the pitman $p$ on the crank-wheel $j$, which is securely fastened on the shaft B. The shaft B is driven by a spur-pinion, G, meshing into the spur-gear F in the rear of the axle, which gear F is driven from the wheels W W and the main axle A through the bevel-gear and pinion D and E. Z' is a clutch on the main axle, which, by means of the eccentric handle $x$ and arm $y$, engages the teeth of clutch on the gear D. B' is a sleeve or shield around the shaft B, and on this sleeve the two arms $a^1$ and $a^2$ of the head-piece $a$ (which supports the cutter-bar) swing; and said sleeve is braced on the side opposite the finger-bar by the arm H, which is fastened at its rear end to the arm J, projecting downward from the shield that surrounds the main axle. $s^1$ is a shield to protect the crank-wheel $j$ and pitman $p$, and is fastened to the sleeve B'. D' is a shield to protect the gear D, and is part of the same casting forming the main frame-work of the machine, which is composed of the tube around the axle A, tube B', and lower part of shield D', which latter also has a cover on top of the gear D, which can be raised on a hinge to give admission to the gearing D and E. P is the pole, pivoted to the main-frame casting at a point, $t$, below the axle, and is braced laterally by the arm I, pivoted at the rear end to the arm J of the main frame. The position of the arm J causes the draft to be applied on one side of the crank-shaft, while the resistance of the finger-bar is on the other, and counterbalances the weight of the latter by the force of the draft. $b^1$ and $b^2$ (see Figs. 1 and 5) are two projections from the shoe $b$ of the finger-bar, by which the finger-bar is pivoted on the rod $c$ to the swinging head-piece $a$, allowing a rocking motion of the finger-bar to more perfectly follow the uneven surface of the ground. The adjustable screw $e$ and chain $f$ prevent the finger-bar from rocking too far. W' is the lead-wheel, pivoted in the shoe $b$. $l$ and $m$ are two separate boxes, held in position by the band $k$, which is drawn tight around them by the dovetail or wedge shape of the pitman-head, and by bolt $n$, which can slide in the slot $o$. This ball-and-socket joint allows the pitman to play freely, whatever position the finger-bar may assume, and as the head $a$, which holds the finger-bar and its connected parts, swings on the sleeve B', around the same center as the crank-shaft B, therefore the pitman and knife-bar can be operated, without being cramped, at any inclination which the finger-bar may assume, even when vertical, which is a great advantage. The pivot $p'$, Figs. 4 and 5, at the end of the pitman-rod, fits into a seat or box in the head of the knife-bar K, and is held in position by the guide $d$. $g$ is a pin, held in place by the spring $d'$, and projecting through the guide $d$ and under the flange $h$ of the shoe $b$, to keep the guide $d$ in position. The guide $d$ is pivoted at the outside end, so that, by withdrawing the spring $d'$ and pin $g$ from under the flange $h$, the guide $d$ can be turned back on its pivoted end and allow the pitman $p$ to be disengaged from the knife-bar K, as shown in Fig. 4.

As the crank-shaft is on the same side of the machine with the cutter-bar, the pitman is quite short, and, being well protected, is not liable to get bent by running against obstructions, and it can be made very much lighter than a long pitman, which requires much stiffness to prevent vibration.

$V^1$ $V^2$ are levers, pivoted to the pole P, the arm $a^1$ of the swinging head $a$, and to each other, in such a manner that when the finger-bar and connecting parts are raised at the inner end by means of the handle $Q'$ operating the chain $s^2$ over the segment Q, then the lever $V^1$ raises the outer end of the cutter-bar. $q$ is a pawl, to hold the segment Q in any desired position. $z$ is the foot-board on the pole $p$. The driver's seat S is supported by a spring on the arms L M, pivoted together at $u'$. The arm L is pivoted at the lower end of the pole at $u$, and the arm M is pivoted to the head R in the rear of the axle.

The head R is made adjustable on the main frame, so that the proper proportion of the driver's weight in the seat S shall operate in conjunction with the draft of the horses applied through the pole at a point, $t$, below the center of the axle A, to lift on the cutter-bar and counterbalance the rotary tendency of the main frame around the axle when in operation. This rotary tendency, which it is desirable to overcome, is considerable, and is caused by the weight of the cutter-bar, the action of the gearing, and the resistance of the finger-bar upon the ground, and the pivoting of the pole at a point, $t$, below the main axle is an important feature.

When the draft of the horses is applied to the whiffletree on the pole P, it is transmitted through the pivot $t$ and brace I to the main frame, and as the machine is drawn forward, the wheels W W revolve and turn the axle A. The clutch $z'$ being brought into connection with the bevel-gear D by means of the eccentric $x$ and arm $y$, the gear D is revolved in the same direction as the drive-wheels W. The force is thus applied to the bevel-pinion E in an upward direction, and the pinion E turning in bearings on the main frame in the rear of the axle, the upward strain at that point tends to rock the main frame over the axle, and bring a downward pressure on the shoe and finger-bar through the frame-shield B' and head $a$; but this pressure is counterbalanced by the draft of the horses on the pivot $t$ at a point below the axle, and by a portion of the driver's weight on head R, which can be adjusted to the different weights of operators.

Thus, much of the drag and side draft usually caused by the cutter-bar in mowers is avoided, and a lighter draft obtained in this improved machine.

Having thus described my invention, what I claim as new, and desire to secure by Letters Patent, is—

1. The finger-bar C, suspended from the main frame in front of the driving-wheel, in combination with the shoe $b$ and pivot $c$, placed on the shoe, and on which it oscillates freely within limits defined by the set-screw $e$ and chain $f$, on an axle parallel to the line of the finger-bar and head-piece $a$, by which the shoe is swung from the frame B at right angles to the line of the crank-shaft, around which it swings in the arc of a circle for the avoidance of obstructions, substantially as set forth.

2. In combination with the main frame, a portion, B', of which carries the finger-bar, the tongue P, pivoted at $t$ to a projection on the main frame immediately under the axle, and projection J and brace I, applying the draft to the frame on one side of the crank-shaft, while the resistance of the finger-bar is on the other, and at the same time counterbalancing the weight of the latter by the force of the draft, substantially as set forth.

3. The guide $d$, pivoted to the shoe $b$, in combination with the spring $d'$, pin $g$, and flange $h$, substantially as described, and for the purpose set forth.

4. The combination of the shoe $b$, lead-wheel W', pivot $c$, swinging head $a$, stop $e$, and chain $f$, substantially as described, and for the purpose set forth.

5. In combination with a finger-bar having transverse oscillation, a pitman and ball-formed crank-pin, and the boxes L and M, covering strap $k$, wedge-shaped head of the pitman $p$, slot $o$, and bolt $n$, so that the pitman may have free transverse oscillation, and the strain on the pitman in drawing against the box made to tighten the fastening of the strap.

6. In combination with the main frame and finger-bar attached thereto and oscillating with it, the seat S, supported on arms L and M, the former of which rests on the pole P, which is attached to the main frame below the axle, and the latter to the frame in rear of the axle, substantially as described.

JOEL GARFIELD.

Witnesses:
GEORGE E. BURT,
STANLEY B. HILDRETH.